(12) United States Patent
Kalwara et al.

(10) Patent No.: US 8,709,565 B2
(45) Date of Patent: Apr. 29, 2014

(54) PRE-PRIMED ROOFING MEMBRANE

(75) Inventors: Joseph Kalwara, Indianapolis, IN (US);
Bernard Obereiner, Noblesville, IN (US); Ross Robertson, Carmel, IN (US);
Anne Hensley Poindexter, legal representative, Carmel, IN (US);
William Gorman, Mooreville, IN (US)

(73) Assignee: Firestone Building Products Company, LLC, Indianapolis, IN (US)

( * ) Notice: Subject to any disclaimer, the term of this patent is extended or adjusted under 35 U.S.C. 154(b) by 470 days.

(21) Appl. No.: 12/524,078

(22) PCT Filed: Jan. 24, 2008

(86) PCT No.: PCT/US2008/000930
§ 371 (c)(1),
(2), (4) Date: Aug. 17, 2010

(87) PCT Pub. No.: WO2008/091661
PCT Pub. Date: Jul. 31, 2008

(65) Prior Publication Data
US 2010/0024955 A1    Feb. 4, 2010

Related U.S. Application Data

(60) Provisional application No. 60/897,370, filed on Jan. 24, 2007.

(51) Int. Cl.
*B32B 7/12* (2006.01)
*B32B 9/04* (2006.01)
*E04D 3/00* (2006.01)

(52) U.S. Cl.
USPC ........ 428/40.1; 428/41.7; 428/41.8; 428/354; 428/911; 52/169.14; 52/309.1; 52/416; 52/417

(58) Field of Classification Search
USPC ............... 428/40.1, 41.7, 41.8, 354, 911; 52/169.14, 309.1, 416, 417
See application file for complete search history.

(56) References Cited

U.S. PATENT DOCUMENTS

| | | | |
|---|---|---|---|
| 4,426,468 A | 1/1984 | Ornum et al. | |
| 4,539,344 A | 9/1985 | Van Ornum et al. | |
| 4,588,637 A | 5/1986 | Chiu | |
| 4,657,958 A | 4/1987 | Fieldhouse et al. | |
| 4,767,658 A | 8/1988 | Lorenz | |
| 4,849,268 A | 7/1989 | Backenstow et al. | |
| 4,855,172 A | 8/1989 | Chiu | |
| 4,932,171 A | 6/1990 | Beattie | |
| 5,242,727 A | 9/1993 | Briddell et al. | |
| 5,504,136 A | 4/1996 | Davis et al. | |
| 5,520,761 A | 5/1996 | Kalwara et al. | |
| 5,545,685 A | 8/1996 | Davis et al. | |
| 5,563,217 A | 10/1996 | Davis et al. | |
| 5,612,141 A | 3/1997 | Davis et al. | |
| 5,667,889 A * | 9/1997 | Katsura et al. | 428/353 |

(Continued)

*Primary Examiner* — Patricia L Nordmeyer
(74) *Attorney, Agent, or Firm* — Jason A. Houser; Arthur M. Reginelli (57) ABSTRACT

A roofing membrane assembly includes a membrane having a top surface, bottom surface, first longitudinal edge and second longitudinal edge. A first primed area is located at the top surface along the first longitudinal edge. A second primed area is located on the bottom surface along the second longitudinal edge. A tape is secured to the membrane on the first primed area. A first release liner is positioned over the tape and a second release liner positioned over the second primed area.

10 Claims, 5 Drawing Sheets

(56) References Cited

U.S. PATENT DOCUMENTS

| | | |
|---|---|---|
| 5,733,621 A | 3/1998 | Cotsakis et al. |
| 5,843,552 A | 12/1998 | Karrfalt |
| 5,859,114 A | 1/1999 | Davis et al. |
| 5,888,602 A | 3/1999 | Davis et al. |
| 5,976,292 A | 11/1999 | Barksdale et al. |
| 5,985,981 A | 11/1999 | Alexander et al. |
| 6,120,869 A | 9/2000 | Cotsakis et al. |
| 6,426,129 B1 * | 7/2002 | Kalwara et al. ............... 428/41.8 |
| 6,863,944 B2 * | 3/2005 | Naipawer et al. ............ 428/40.1 |
| 7,000,360 B1 | 2/2006 | Russell et al. |
| 7,044,411 B2 | 5/2006 | Knowlton |
| 2003/0015275 A1 | 1/2003 | Phillips et al. |
| 2003/0054127 A1 | 3/2003 | Heifetz |
| 2003/0177736 A1 | 9/2003 | Gatherum |
| 2004/0065232 A1 | 4/2004 | Lykke |
| 2004/0188008 A1 | 9/2004 | Robison et al. |
| 2006/0046068 A1 | 3/2006 | Barancyk et al. |
| 2006/0127627 A1 | 6/2006 | Larson |
| 2006/0243388 A1 | 11/2006 | Kubiak et al. |

\* cited by examiner

PRE-PRIMED ROOFING MEMBRANE

This application claims the benefit of PCT Application Serial No. PCT/US2008/000930, filed on Jan. 24, 2008, and U.S. Provisional Patent Application Ser. No. 60/897,370, filed on Jan. 24, 2007, which is incorporated herein by reference.

FIELD OF THE INVENTION

One or more embodiments of the present invention relate to a roofing membrane including a pre-applied adhesive primer. In other embodiments a roofing membrane may be provided including a pre-applied adhesive primer, a pre-applied adhesive tape and combinations thereof. In still other embodiments of the present invention a roofing flashing may be provided including a pre-applied adhesive primer and a release liner.

BACKGROUND OF THE INVENTION

The construction industry commonly uses single ply membranes to provide a waterproof barrier on flat or low-slope roofs. It is prohibitively expensive and difficult to produce and transport a single membrane that is sized to cover an entire roof surface, thus, a plurality of individual membranes are provided and oriented in an overlapping arrangement. The overlapping portions, or splices, of these individual membranes must be secured together to ensure that the plurality of membranes form a single waterproof surface.

One attachment approach is to secure the adjoining membranes together using an adhesive tape. These tapes are positioned between adjacent membrane surfaces and when such surfaces are brought together, the membranes are thereafter secured together. In order to ensure that these tapes effectively bond the adjoining membranes, the areas where tape application occurs should be prepared using a primer. The primer application removes dirt and other debris that may inhibit bonding. Further, the primer leaves a tacky surface upon which the adhesive tape is applied. This preparation process enhances the adhesion of the tape and consequently helps prevent leaking and/or separation.

Currently, primers are applied to the membranes while in the field, just before the tape adhesive is applied to the membrane. The tape adhesive is packaged on release liners, which may be paper or plastic based material possessing engineered release characteristics to prevent unwanted adhesion and allow proper unrolling and placement of tape on the primed membrane. After the tape is applied to the primed membrane, the release liner is removed to expose the top side of the tape adhesive. The overlapping primed portion of the adjoining membrane is then mated to the tape adhesive to affix the two membranes together and create a water tight barrier at the lap areas between adjacent membrane panels.

Field priming of the membrane panels is performed by roofing mechanics. During application in the field, roof mechanics are exposed to the primer chemicals and solvents by direct physical contact during the dispensing and application of the primer and indirectly to the primer's solvent fumes and volatile organic chemicals during the flash-off period.

Field priming of the membrane panels is also subject to improper application. For example, roof mechanics may not apply enough primer or apply it unevenly. They may apply the tape before the flash-off period is complete, leading to a degradation of the resulting tape adhesive bond. The mechanic may apply the tape too long after primer application allowing dirt and moisture to collect on the primed surfaces. In each of the above instances, the integrity of the field seams may be jeopardized.

In addition to roofing membrane panels, roof flashing also conventionally requires application of an adhesive primer as discussed above. Roof flashing is commonly available to contractors in narrow rolls, which are typically used for repairs or for detail work on roofing systems, and is secured to the roofing membranes or an underlying substrate by use of adhesive tape similar to that used in conjunction with the roof membranes. Thus, the application of the adhesive-primer to flashing at the jobsite is subject to the same limitations and disadvantages as with the on-site application of membrane primers. Particularly, seams having compromised integrity due to improper application of the primer can be a problem to roofing mechanics.

Thus, there exists a need in the art for means to provide factory-primed areas of roofing membranes and roof flashing in a manner that reduces the risk of roofer misapplication and/or rooftop contamination, as well as reduces the exposure of workers to harmful chemicals. Further, there exists a need to standardize the priming operation to facilitate the receipt of tape adhesive.

SUMMARY OF THE INVENTION

One or more embodiments of the present invention provide a roofing membrane assembly including a membrane having a top surface and a bottom surface and a first longitudinal edge and a second longitudinal edge, a first primed area on the top surface along the first longitudinal edge, a second primed area on the bottom surface along the second longitudinal edge, a tape secured to the membrane on one of the first primed area and the second primed area, a first release liner positioned over the tape; and a second release liner positioned over the other of the first primed area and the second primed area.

One or more embodiments of the present invention also provides a roofing membrane assembly including a membrane having a top surface and a bottom surface and a first longitudinal edge and a second longitudinal edge, a first primed area on the top surface along the first longitudinal edge, a second primed area on the bottom surface along the second longitudinal edge, a first release liner positioned over the first primed area; and a second release liner positioned over the second primed area.

One or more embodiments of the present invention also provides a roofing membrane assembly including a membrane having a top surface and a bottom surface and a first longitudinal edge and a second longitudinal edge, a first primed area on the top surface along the first longitudinal edge, a second primed area on the bottom surface along the second longitudinal edge, and a release liner positioned over each primed area along one of the first longitudinal edge of the top surface and the second longitudinal edge of the bottom surface.

One or more embodiments of the present invention also provides a flashing assembly including a flashing membrane having a bottom surface, a primed area on the bottom surface of the flashing membrane, and a release liner positioned over the primed area.

DETAILED DESCRIPTION OF THE ILLUSTRATIVE EMBODIMENTS

Figure 1:
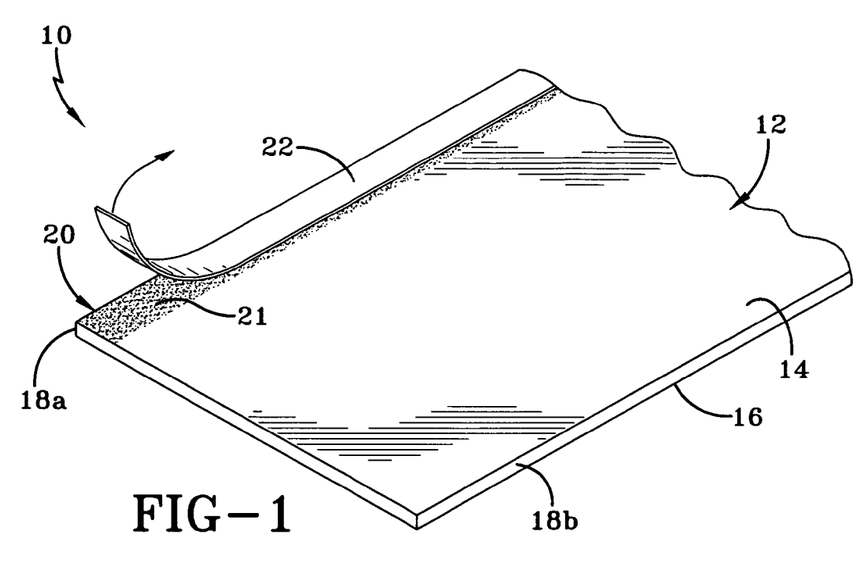
FIG. 1 is a fragmentary perspective view of a membrane assembly made according to the methods of the present invention.

Referring now to FIG. 1, a membrane assembly is shown, generally indicated by the numeral 10. Membrane assembly 10 includes a membrane 12 that is preferably waterproof and weather resistant. In one or more embodiments the membranes of the present invention may be a thermoset material. In other embodiments the membrane may be a thermoformable material. In one or more embodiments, the membrane may be EPDM based. In other embodiments, the membrane may be TPO based. In these or other embodiments, the membrane may be flexible and capable of being rolled up for shipment. In these or other embodiments the membrane may include fiber reinforcement.

Membrane 12 includes a top surface 14 and a bottom surface 16, which is generally spaced from top surface 14. Membrane 12 may be in the form an elongated strip and include a pair of spaced longitudinal edges 18a and 18b. In one or more embodiments, membrane 12 may be from about 25 to about 400 feet (8-122 m) in the longitudinal direction. In these or other embodiments, membrane 10 may be from about 3 to about 50 feet (0.9-15 m) in the transverse direction.

In the present embodiment, a primer 20 is factory applied on a portion of top surface 12 adjacent longitudinal edge 18a, forming a primed area 21. Primer 20 may be solvent based. In one or more embodiments polymeric material may be suspended or dissolved in the solvent. In one or more embodiments, the primer may be less than 20 percent solids. In other embodiments the primer may be less than 16 percent solids. In still other embodiments the primer may be less than 10 percent solids. In one or more embodiments the polymeric material may include polymer tacifying resins. Examples of suitable solvent-based primers may include Firestone QuickPrime™ Plus, Firestone QuickPrime™ Plus LVOC, ADCO HSSP-1, Ashland PLIOSEAL™ 9705. In one or more embodiments, primer 20 is disposed adjacent to substantially the entire longitudinal edge 18a. In these or other embodiments, primer 20 may extend from longitudinal edge 18a along top surface 20 in a transverse direction for a desired distance, which may be about 3 to 12 inches (76-305 mm) from the longitudinal edge. Those skilled in the art will appreciate that the width of the primed area may vary and may be designed based upon the width of the desired adhesive.

As is known in the art, primers typically include solvents and carrier components that, upon exposure to air, will vaporize. After application to membrane 12, the volatile portion of the primer substantially vaporizes, with the solids portion remaining on membrane 12 being thereafter ready to promote adhesion as will be hereinafter described. This vaporization period is also known as the "flash-off" period. Thus, it should be appreciated that after a sufficient "flash-off" period, primed area 21 is generally tacky and substantially free from dirt, debris or other contaminates that may inhibit adhesion between adjoining membranes. After solvent flash off, the remaining solids portion of the primer may be described as a polymeric film. In one or more embodiments, the film includes a thickness of greater than 0.001 inches (25 μm). In still other embodiments, the film includes a thickness of less than 0.007 inches (178 μm). In other embodiments, the film includes a thickness of less than 0.005 inches (127 μm). In still other embodiments, the film includes a thickness of less than 0.003 inches (76 μm).

Though the primer of the present invention is tacky, it does not exhibit the same adhesive qualities as the adhesive tape described herein below. For example, a lap seam formed with just two primed surfaces and no tape may be characterized by a peel strength of less than 1.0 pli (1.75 N/cm). A lap seam including primed surfaces and adhesive tape may be characterized by a peel strength of at least 1.8 pli (3.15 N/cm). In other embodiments the peel strength of the taped lap seam may be at least 2 pli (3.5 N/cm). In still other embodiments the peel strength of the taped lap seam may be at least 2.2 pli (3.85 N/cm). As is known in the art, peel strength can be determined by ASTM D413.

Membrane assembly 10 further includes a release liner 22 that is positioned over primer 20 to prevent contaminates from contacting and collecting on the primed area. The tackiness of primer 20 holds release liner 22 thereon. Release liner 22 may include a thin film or coating to which the primer may form a temporary bond. However, this bond can be readily broken by applying minimal tension. Release liner 22 may advantageously provide protection to primed area 21 during storage or shipment, and may remain in place until a roof mechanic removes it during rooftop membrane installation prior to installation of tape adhesive. In one or more embodiments release liner 22 may be between approximately 1 and 9 mils (25-229 μm) in thickness, in other embodiments between approximately 1 and 7 mils (25-178 μm) in thickness, in still other embodiments between approximately 2 and 6 (51-152 μm) mils in thickness, and in yet other embodiments between approximately 2 and 4 (51-102 μm) mils in thickness.

In one or more embodiments, release liner 22 may include a paper or cellulosic structure coated with a polymeric coating. In other embodiments, release liner 22 may include a homogeneous polymeric structure; for example, release liner 22 may include a polyester or polyolefin film. Suitable materials for release liner 22 include polypropylene, polyester, high-density polyethylene, medium-density polyethylene, low-density polyethylene, polystyrene or high-impact polystyrene. Such polymeric materials offer a number of advantageous properties, including high moisture resistance, good resistance to temperature fluctuations during processing and storage, high tear resistance. In one or more embodiments, these release liners may also be provided with anti-static surface coatings. In addition to the above polymeric release liner materials, release liner 22 may also be made of kraft paper.

Thus membrane assembly 10 includes a factory applied primer that is covered and protected by a release liner. By applying the primer in a controlled factory environment, contamination is minimized. Further, factory application of primer 20 allows for additional safety precautions during the "flash-off" period. Specifically, proper ventilation may be ensured so that the exposure of workers to harmful fumes is prevented. Further, this method allows metered application of the primer and enables more effective and standardized scrubbing and preparation of the membrane. In one or more embodiments, factory application includes application of primer or adhesive in the location where the membrane is manufactured. In these or other embodiments, factory application includes application of primer or adhesive in a location where final fabrication of the membrane assembly takes place; that is, where the primer and release liner are applied to the membrane prior to delivery to the roof. In any event, factory application includes application of the primer or adhesive at a location that is distinct from where the membrane is secured to the roof (e.g. job site), and is typically at a location of final fabrication of the membrane assembly prior to shipment of the membrane assembly to a storage facility or prior to shipment to the job site. In one or more embodiments, factory application of primer may be referred to a pre-priming.

Figure 2:
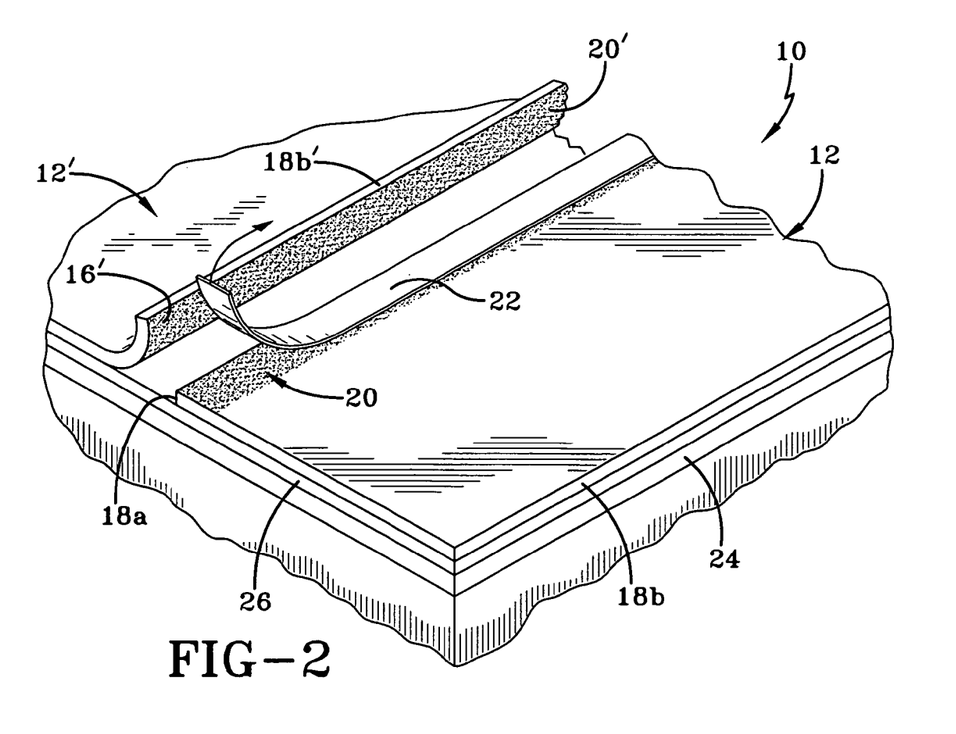
FIG. 2 is a fragmentary perspective view showing the removal of the release liner from a membrane of the membrane assembly of FIG. 1.

A method of installing membrane assembly 10 will now be described with reference to FIG. 2. In a first step, membrane assembly 10 is positioned on a roof surface. The roof surface may include a roof deck 24 that supports the various roof components. An insulation layer 26 may be provided on top of roof deck 24 that helps prevent thermal gain during warm periods and thermal loss during cold periods.

In a second step, a second membrane 12' is positioned next to first membrane 12. A primer 20' may be applied to bottom surface 16' of second membrane 12' along longitudinal edge 18b' to form a primed area 21'. The solvent portions of primer 20' are then allowed to flash off.

Figure 3:
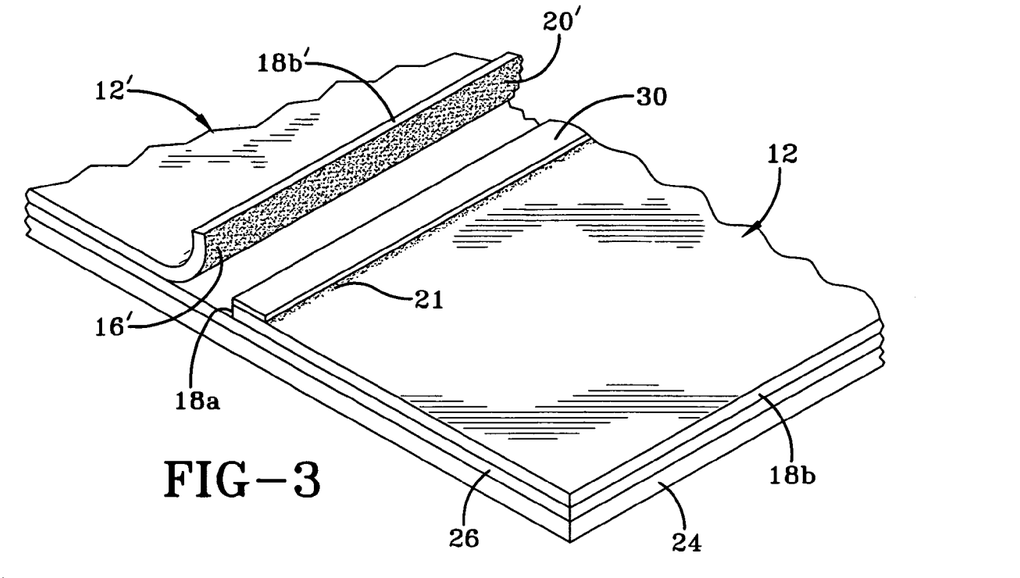
FIG. 3 is a fragmentary perspective view showing the application of an adhesive tape to the first membrane.

In a third step, release liner 22 is pulled away from membrane 12, exposing primed area 20. Referring now to FIG. 3, in a fourth step, an adhesive tape 30 is applied proximate to longitudinal edge 18a on primed area 21 of membrane 12. The adhesive tapes that may be used include a solid adhesive, which may also be referred to as a solid adhesive strip, and may include those that are conventional in the art. In one or more embodiments, the adhesive tape may include EPDM and/or butyl rubber. In one or more embodiments the adhesive tapes include at least 85 percent solids. In other embodiments, the adhesive tapes include at least 90 percent solids. In other embodiments, the adhesive tapes include at least 95 percent solids. In still other embodiments the adhesive tapes include at least 99 percent solids. In one or more embodiments, the adhesive tape includes a thickness of greater than 0.007 inches (0.178 mm). In other embodiments, the tape includes a thickness greater than 0.01 inches (0.25 mm). In still other embodiments, the adhesive tape includes a thickness greater than 0.1 inches (2.54 mm). Useful adhesive tapes are disclosed in U.S. Pat. Nos. 6,120,869, 5,888,602, 5,859,114, 5,733,621, 5,612,141, 5,563,217, 5,545,685, 5,504,136, 5,242,727, 4,932,171, 4,849,268, 4,657,958, 4,855,172, 4,588,637, 4,539,344, and 4,426,468 which are incorporated herein by reference. Useful tapes are commercially available including those available under the tradenames Quick-Seam™ (Firestone), PLIOSEAL™ (Ashland), 510™ (Adco), 505™ (Adco).

Figure 4:
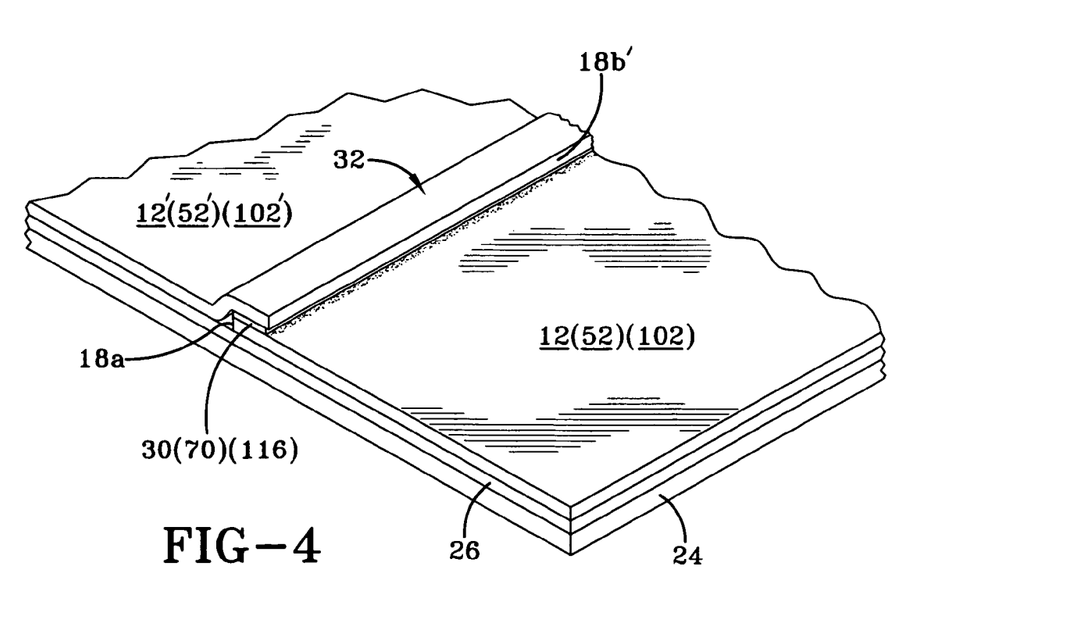
FIG. 4 is a fragmentary perspective view showing the first membrane and the second membrane adhered to one another at a lap seam.

In a fifth step, shown in FIG. 4, the primed area 21' of bottom surface 16' of second membrane 12' is pressed into contact with adhesive tape 30. In this manner, a water resistant lap seam 32 is formed between first membrane 12 and second membrane 12'. As is evident, a time savings is achieved by pre-applying the primer prior to roof installation, as only second membrane 12' requires in-field priming. Likewise, primer solvent fumes are reduced and contamination risk is minimized.

It should be appreciated that the above referenced method may be varied without departing from the teachings of the present invention. For example, the factory primed area 21 may be positioned to face toward the roof deck, as primed area 21' of second membrane 12'. Further, tape 30 may be applied first to the primed area 21' of second membrane 12'.

Figure 5:
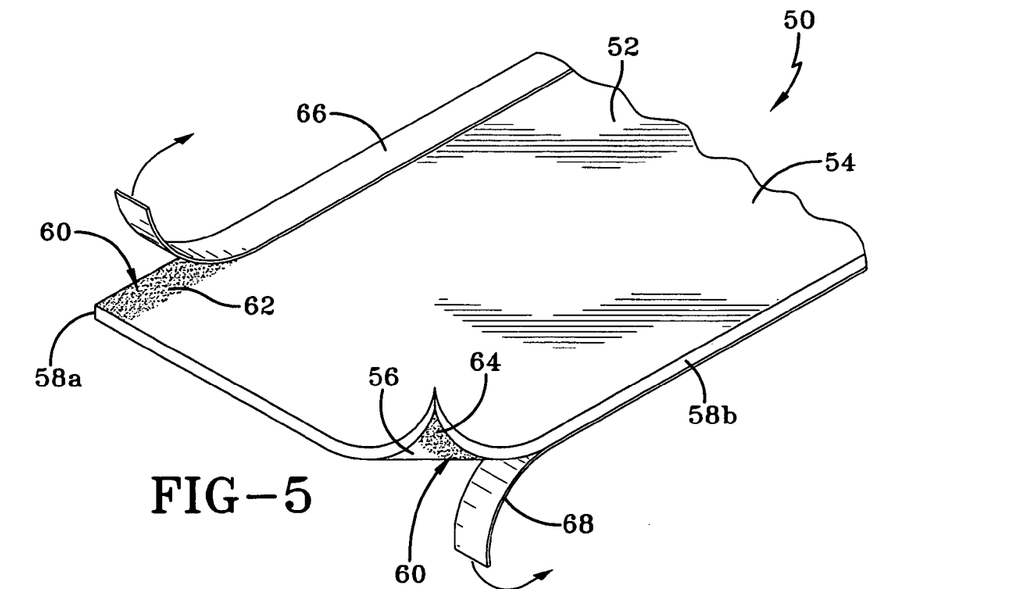
FIG. 5 is a fragmentary perspective view of a first alternate membrane assembly made according to the methods of the present invention.

Referring now to FIG. 5, a first alternate membrane assembly is shown, generally indicated by the numeral 50. Membrane assembly 50 includes a membrane 52 having a top surface 54 and a bottom surface 56. Membrane 52 may be in the form an elongated strip and include a pair of spaced longitudinal edges 58a and 58b. In one or more embodiments, membrane 52 may be from about 25 to 400 feet (8-122 m) in the longitudinal direction. In these or other embodiments, membrane 32 may be from about 3 to 50 (0.9-15 m) feet in the transverse direction.

A primer 60 is disposed on a portion of top surface 54 adjacent longitudinal edge 58a forming a first primed area 62. In one or more embodiments, primer 60 is factory applied adjacent to substantially the entire longitudinal edge 58a. In these or other embodiments, primed area 62 may extend from longitudinal edge 58a along top surface 54 in a transverse direction for a desired distance, which may be about 3 to 12 inches (76-305 mm). Primer 60 is also disposed on a portion of bottom surface 56 adjacent longitudinal edge 58b, forming a second primed area 64. In one or more embodiments, primer 60 is factory applied adjacent to substantially the entire longitudinal edge 58b. In these or other embodiments, second primed area 64 may extend from longitudinal edge 58b along top surface 54 in a transverse direction for a desired distance, which may be about 3 to 12 inches (76-305 mm).

Membrane assembly 50 further includes a first release liner 66 that is positioned over first primed area 62, and a second release liner 68 positioned over second primed area 64. As described above, the tackiness of primer 60 holds release liners 66 and 68 thereon.

Figure 6:
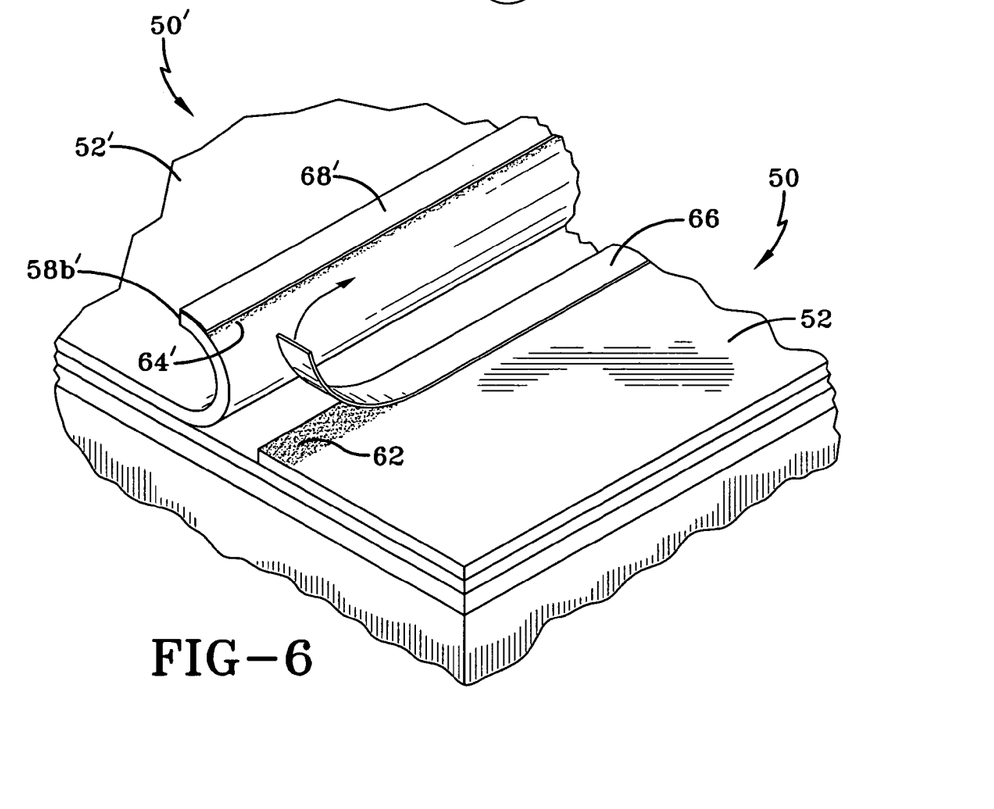
FIG. 6 is a fragmentary perspective view of a pair of membranes of the first alternate membrane assembly of FIG. 5, positioned adjacent to one another and with release liner of the bottom membrane being removed.
Figure 7:
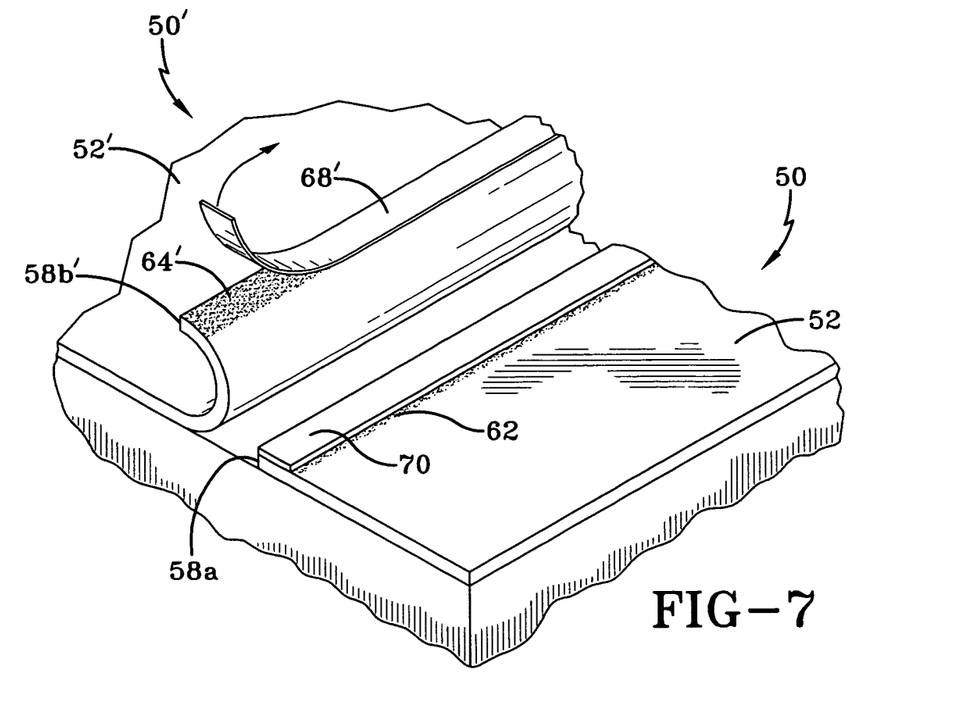
FIG. 7 is a fragmentary perspective view showing the removal of the release liner from the top membrane and application of an adhesive tape on a primed area of the bottom membrane of FIG. 6.

A method of installing first alternate membrane assembly 50 will now be described with reference to FIG. 6. In a first step, a first membrane assembly 50 is positioned on a roof surface with a second membrane assembly 50' adjacent thereto. In a second step, release liner 66 is pulled away from first membrane 52, exposing first primed area 62. Referring now to FIG. 7, in a third step, an adhesive tape 70 is field applied proximate to longitudinal edge 58a on the first primed portion 62 of membrane 52.

In a fourth step, second release liner 68' is pulled away from second membrane 52' to expose second primed area 64'. Finally, in a fifth step, shown in FIG. 4, second primed area 64' of second membrane 52' is pressed into contact with tape 70. In this manner, a water resistant lap seam 32 is formed between first membrane 52 and second membrane 52'. As is evident, an installation time savings is achieved by factory-applying the primer along opposed edges and alternately on the bottom and top surface. In the present embodiment, no in-field priming is required. In this manner, primer solvent fumes are greatly reduced, limiting VOC emissions, and minimizing field contamination risks. Further, it is ensured that the correct amount of primer is uniformly applied to membranes 52, 52'. Still further, this method ensures the proper preparation of the membranes 52, 52'.

It should be appreciated that the above referenced method may be varied without departing from the teachings of the present invention. For example, tape 70 may be applied first to the primed surface 64' of second membrane 52'.

Figure 8:
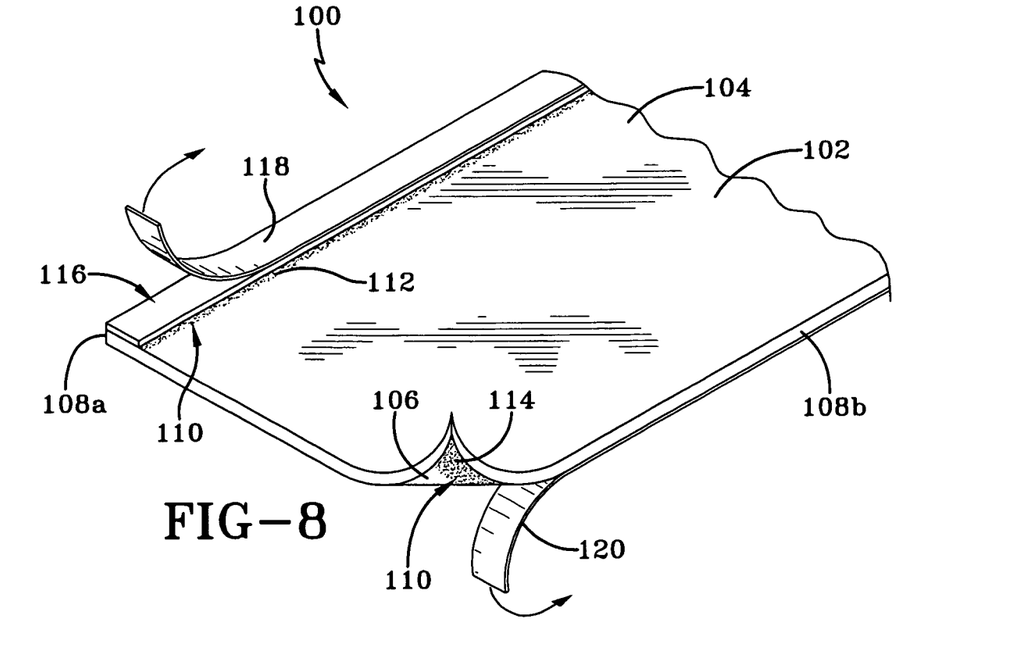
FIG. 8 is a fragmentary perspective view of a second alternate membrane assembly made according to the methods of the present invention.

Referring now to FIG. 8, a second alternate membrane assembly is shown, generally indicated by the numeral 100. Membrane assembly 100 includes a membrane 102 having a top surface 104 and a spaced bottom surface 106. Membrane 100 may be in the form an elongated strip and include a pair of spaced longitudinal edges 108a and 108b. In one or more embodiments, membrane 102 may be from about 25 to 400 feet (8-122 m) in the longitudinal direction. In these or other embodiments, membrane 102 may be from about 3 to 50 feet (0.9-15 m) in the transverse direction.

A primer 110 is disposed on a portion of top surface 102 adjacent longitudinal edge 108a forming a first primed area 112. In one or more embodiments, primer 110 is disposed adjacent to substantially the entire longitudinal edge 108a. In these or other embodiments, primed area 112 may extend from longitudinal edge 108a along top surface 104 in a transverse direction for a desired distance, which may be about 3 to 12 inches (76-305 mm).

Primer 110 is also disposed on a portion of bottom surface 106 adjacent longitudinal edge 108b, forming a second primed area 114. In one or more embodiments, primer 110 is disposed adjacent to substantially the entire longitudinal edge 108b. In these or other embodiments, primed area 114 may extend from longitudinal edge 108b along top surface 104 in a transverse direction for a desired distance, which may be about 3 to 12 inches (76-305 mm).

Membrane assembly 100 further includes an adhesive tape 116 on top surface 102 adjacent longitudinal edge 108a. Adhesive tape 116 may be any conventional adhesive tape known to those skilled in the art. Adhesive tape 116 is provided on top of primed area 112 to ensure proper adhesion to membrane 102. A first release liner 118 is positioned over adhesive tape 116, and a second release liner 120 is positioned over second primed area 114. The tackiness of adhesive tape 116 and primer 110 respectively holds release liners 118 and 120 thereon.

Figure 9:
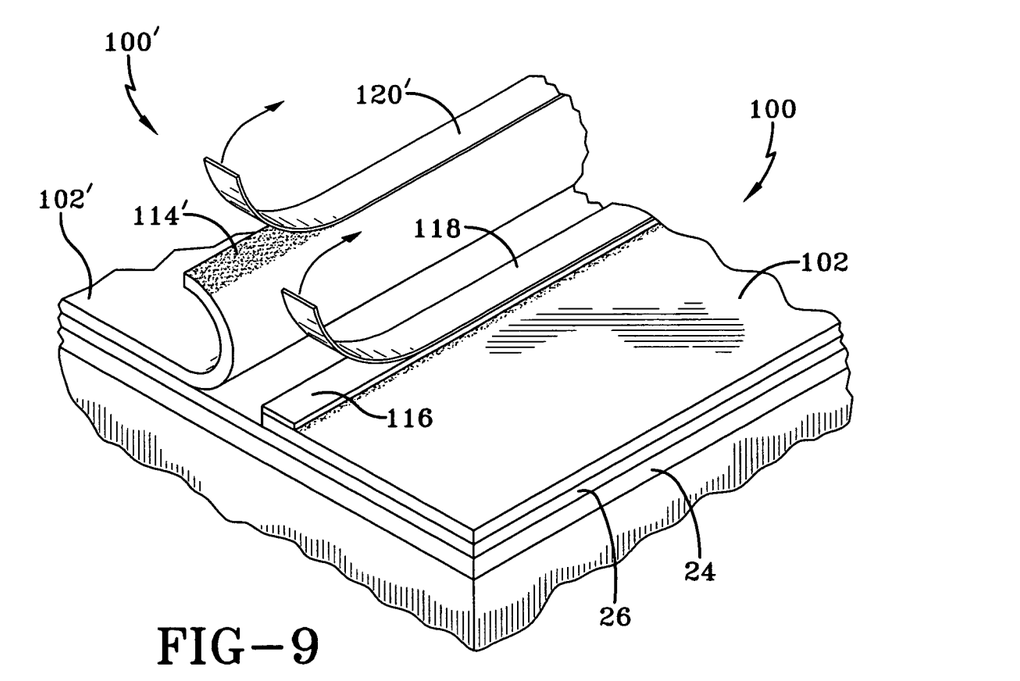
FIG. 9 is a fragmentary perspective view of a pair membranes of the second alternate membrane assembly of FIG. 8, positioned adjacent to one another and with release liners being removed.

A method of installing second alternate membrane assembly 100 will now be described. In a first step, a first membrane assembly 100 is positioned on a roof surface with a second membrane assembly 100' adjacent thereto. With reference now to FIG. 9, in a second step, first release liner 118 is removed from tape 116 on first membrane 102, thereby exposing adhesive tape 116. Further, second release liner 120' is pulled away from second primed area 114' of second membrane 100' to expose second primed area 114'. Finally, in a fourth step, shown in FIG. 4, second primed area 114 of second membrane 102' is pressed into contact with tape 116. In this manner, a water resistant lap seam 32 is formed between first membrane 102 and second membrane 102'.

As is evident, an installation time savings is achieved by pre-applying the primer so that no in-field priming is required. Further time savings are realized by pre-applying the adhesive tape prior to installation.

It should be appreciated that the above referenced method may be varied without departing from the teachings of the present invention. For example, factory applied tape 116 may be positioned on second primed area 114' second facing toward the roof deck.

Figure 10:
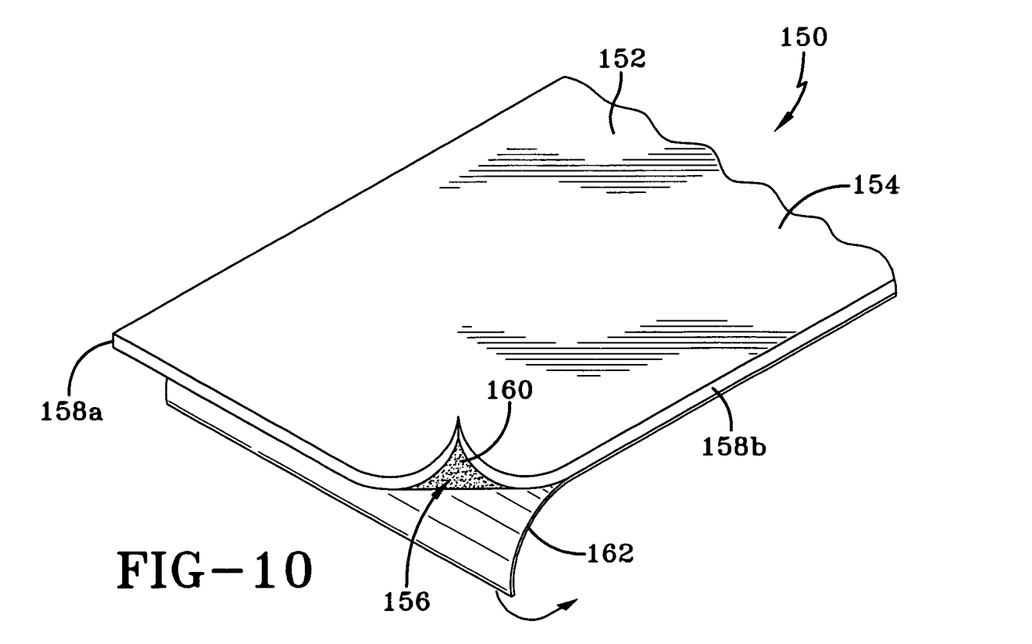
FIG. 10 is a fragmentary perspective view of a flashing membrane assembly with a release liner being removed according to the third alternate embodiment of the present invention.

Referring now to FIG. 10, a third alternative embodiment of the invention is shown. In this embodiment a flashing assembly is provided and is generally indicated by the numeral 150. Flashing assembly 150 includes a flashing membrane 152 having a top surface 154 and a spaced bottom surface 156. Flashing membrane 152 may of the same materials as used to make the membranes described hereinabove, such as EPDM, and may be used to repair existing membrane assemblies, in the installation of detail work on a roof assembly, as a batten cover, as a gravel stop flashing, or as perimeter flashing. Flashing membrane 152 may also be made of other materials, such as Neoprene™ (Dupont) or polybutadiene rubber, and may be provided in a cured, partially cured, or uncured state. Flashing membrane 152 may be in the form of an elongated and narrow strip and may include a pair of spaced longitudinal edges 158A and 158B. In one or more embodiments flashing membrane 152 may be from about 50 to about 100 feet (15-30 m) in the longitudinal direction. In these or other embodiments flashing membrane 152 may be from about 3 to about 48 inches (76-1219 mm) wide in the transverse direction. In these or other embodiments flashing membrane 152 may be from about 0.030 to 0.075 inches (762-1905 μm) thick in the direction between top surface 154 and bottom surface 156.

A primer 160 is disposed on at least a portion of bottom surface 156. In one or more embodiments, the primer is factory applied. Primer 160 may include those primers described hereinabove as discussed with respect to roof membrane assemblies. In a preferred embodiment, as shown in FIG. 10, primer 160 is disposed on substantially all of bottom surface 156. In other embodiments, primer 160 may be disposed along longitudinal edges 158A and 158B of bottom surface 160. A release liner 162 is positioned over primed bottom surface 156. In one or several embodiments release liner 162 may be a silicone treated kraft paper. In other other embodiments release liner 162 may be made of any material listed above with respect to the pre-primed membrane release liners. Release liner 162 may cover substantially all of bottom surface 156, or only those parts of bottom surface 156 that are provided with primer 160, and is held in place by the tackiness of primer 160. In other embodiments release liner 162 may be slightly larger than bottom surface 156 such that it overhangs longitudinal edges 158A and 158B, thereby facilitating peeling off of release liner 162 when so desired.

A method of manufacturing flashing assembly 150 will now be described. In a first step flashing membrane 152 is formed through an extrusion die, as is known to persons skilled in the art. Flashing membrane 152 is extruded onto release liner 162 in an approximate length of between 50 and 100 feet. The uncured flashing membrane 152 and release liner 162 is then wound into a roll, with release liner 162 preventing the successive layers of membrane 152 from sticking together. The roll is then mounted onto a primer application device. The roll of flashing membrane 152 is then unwound and the release liner is simultaneously separated from bottom surface 156 of flashing membrane 152. Flashing membrane 152 then proceeds across or through a primer applicator where a measured amount of primer 160 is applied to bottom surface 156. In one or more embodiments, the primer applicator may be a metering rod, spray applicator, a roller, brushes, or a dipping mechanism. Primer 160 may then be dried by a combination of heat and circulated air. In a final step, the same release liner 162 upon which the flashing membrane was extruded is brought back into contact with primed bottom surface 156 just prior to flashing membrane 152 being again wound into a roll with release liner 162 separating the successive layers. In this way a flashing membrane 152 having a pre-primed surface 156 and a protective release liner 162 may be produced.

It should be appreciated that practice of the present invention may provide a method for covering a roof top with a membrane, particularly a thermoset membrane, in the absence or substantial absence of the use of volatile organic compounds such as those used in the prior art for primers and liquid adhesives. Inasmuch as certain embodiments of the present invention provide membrane with both factory-applied primed surfaces and factory-applied adhesive surfaces, the vast majority of the area of a flat or low-sloped roof can be covered with little or no volatile organic compounds being used. In fact, the use of volatile organic compounds, such as primers, can be further reduced when the pre-primed and factory-applied adhesive membrane assemblies are used in conjunction with the pre-primed flashing assemblies. When these assemblies are used in conjunction, the need for volatile organic compounds, such as primers, can be eliminated or at least greatly reduced inasmuch as they may only be needed in certain situations such as cut lap seems.

Various modifications and alterations that do not depart from the scope and spirit of this invention will become apparent to those skilled in the art. This invention is not to be unduly limited to the illustrative embodiments set forth herein.

The invention claimed is:

1. A roofing membrane assembly comprising:
    a roofing membrane having a top surface, a bottom surface, a first longitudinal edge and second longitudinal edge;
    a primed area along one of said first longitudinal edge on said top surface or a primed area along one of said second longitudinal edge on said bottom surface, said primed area having a thickness of less than 0.007 inches; and
    a release liner disposed on and detachably adhered to said primed area so as to form a temporary bond directly between said release liner and said primed area.

2. A roofing membrane assembly comprising:
    a roofing membrane having a top surface, a bottom surface, a first longitudinal edge and a second longitudinal edge;
    a first primed area along said first longitudinal edge on said top surface, said first primed area having a thickness of less than 0.007 inches;
    a first release liner disposed on and detachably adhered to said first primed area so as to form a temporary bond directly between said first release liner and said first primed area;
    a second primed area along said second longitudinal edge on said bottom surface;
    an adhesive tape positioned on said second primed area; and
    a second release liner disposed on and detachably adhered to said adhesive tape.

3. A roofing membrane assembly according to claim 2, wherein said second primed area has a thickness of less than 0.007 inches.

4. A roofing membrane assembly according to claim 3, wherein said adhesive tape is secured to another membrane when said release liner is removed so as to form a lap seam having a peel strength of at least 1.8 pli.

5. A roofing membrane assembly according to claim 2, where said membrane is between about 25 feet to about 400 feet long in the longitudinal direction.

6. A roofing membrane assembly according to claim 2, where said membrane is between about 3 feet to about 50 feet wide in the transverse direction.

7. A roofing membrane assembly according to claim 2, where said primed area includes a solvent based primer.

8. A roofing membrane assembly according to claim 7, where said primer contains less than 20% solids.

9. A roofing membrane assembly according to claim 2, where said membrane is made of EPDM.

10. The roofing membrane assembly according to claim 2, where the primed area is characterized by a tack that has a peel strength of less than 1.0 pli, as determined by ASTM D413, when tested on a lap seam formed by two primed surfaces without a tape.

* * * * *